United States Patent
Li et al.

(10) Patent No.: US 12,268,961 B2
(45) Date of Patent: Apr. 8, 2025

(54) POSITIONING METHOD AND DEVICE FOR GAME AND MOBILE TERMINAL

(71) Applicant: NETEASE (HANGZHOU) NETWORK CO., LTD., Zhejiang (CN)

(72) Inventors: Junxian Li, Zhejiang (CN); Jiayao Li, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 0 days.

(21) Appl. No.: 17/791,976

(22) PCT Filed: Nov. 30, 2021

(86) PCT No.: PCT/CN2021/134472
§ 371 (c)(1),
(2) Date: Jul. 11, 2022

(87) PCT Pub. No.: WO2022/247196
PCT Pub. Date: Dec. 1, 2022

(65) Prior Publication Data
US 2024/0216807 A1   Jul. 4, 2024

(30) Foreign Application Priority Data
May 24, 2021 (CN) .......... 202110568646.X (51) Int. Cl.
*A63F 13/45* (2014.01)
*A63F 13/2145* (2014.01)
(Continued)

(52) U.S. Cl.
CPC ...... *A63F 13/5372* (2014.09); *A63F 13/2145* (2014.09); *A63F 13/5378* (2014.09);
(Continued)

(58) Field of Classification Search
CPC .... A63F 13/20; A63F 13/2145; A63F 13/216; A63F 13/25; A63F 13/426; A63F 13/45;
(Continued)

(56) References Cited

U.S. PATENT DOCUMENTS

| | | | |
|---|---|---|---|
| 2008/0076579 A1* | 3/2008 | Tabata | A63F 13/79 463/42 |
| 2018/0199022 A1* | 7/2018 | Ueda | G06T 7/73 |

(Continued)

FOREIGN PATENT DOCUMENTS

| | | |
|---|---|---|
| CN | 109395388 A | 3/2019 |
| CN | 110215691 A | 9/2019 |

(Continued)

OTHER PUBLICATIONS

International Search Report and Written Opinion with regard to the PCT/CN2021/134472 mailed Feb. 25, 2022.
(Continued)

*Primary Examiner* — Omkar A Deodhar
(74) *Attorney, Agent, or Firm* — Patterson + Sheridan, LLP (57) ABSTRACT

The present disclosure provides a positioning method and device for a game and a mobile terminal, including: providing a first game map and a positioning icon through the graphical user interface; controlling, in response to a first dragging operation acting on the first game map, the positioning icon to be fixed at a position, and controlling the first game map to move relative to the positioning icon; and determining, in response to ending of the first dragging operation, a target position according to a first position at which the positioning icon is located in the first game map. The present disclosure can effectively improve the precision of determining the target position, thereby significantly improving the game experience of players.

19 Claims, 5 Drawing Sheets

(51) Int. Cl.
*A63F 13/5372* (2014.01)
*A63F 13/5378* (2014.01)
*A63F 13/92* (2014.01)
*G06F 3/04817* (2022.01)
*G06F 3/0486* (2013.01)
*G06F 3/0488* (2022.01)

(52) U.S. Cl.
CPC .......... *A63F 13/92* (2014.09); *G06F 3/04817* (2013.01); *G06F 3/0486* (2013.01); *G06F 3/0488* (2013.01); *A63F 2300/308* (2013.01)

(58) Field of Classification Search
CPC ...... A63F 13/50; A63F 13/52; A63F 13/5378; A63F 13/55; A63F 13/70; A63F 13/79
See application file for complete search history.

(56) References Cited

U.S. PATENT DOCUMENTS

| | | | |
|---|---|---|---|
| 2019/0060762 A1* | 2/2019 | Casado | A63F 13/69 |
| 2019/0070494 A1* | 3/2019 | He | H04M 1/00 |
| 2019/0095070 A1* | 3/2019 | Oyama | G06F 3/0488 |
| 2019/0255437 A1* | 8/2019 | Wang | A63F 13/5378 |
| 2021/0046382 A1* | 2/2021 | Wu | A63F 13/85 |
| 2022/0314119 A1* | 10/2022 | Wen | A63F 13/5372 |

FOREIGN PATENT DOCUMENTS

| | | |
|---|---|---|
| CN | 110270086 A | 9/2019 |
| CN | 112619124 A | 4/2021 |
| CN | 112619137 A | 4/2021 |
| CN | 113694527 A | 11/2021 |

OTHER PUBLICATIONS

English Abstract for CN113694527 retrieved on Espacenet on Jul. 8, 2022.
English Abstract for CN109395388 retrieved on Espacenet on Jul. 8, 2022.
English Abstract for CN112619124 retrieved on Espacenet on Jul. 8, 2022.
English Abstract for CN110215691 retrieved on Espacenet on Jul. 8, 2022.
English Abstract for CN110270086 retrieved on Espacenet on Jul. 8, 2022.
English Abstract for CN112619137 retrieved on Espacenet on Jul. 8, 2022.

* cited by examiner

POSITIONING METHOD AND DEVICE FOR GAME AND MOBILE TERMINAL

CROSS-REFERENCE TO RELATED APPLICATIONS

The present disclosure claims the priority of the Chinese Patent Application No. 202110568646.X, entitled as "Positioning Method and Device for Game and Mobile Terminal" filed with the Chinese Patent Office on May 24, 2021, the entire contents of which are incorporated by reference in this disclosure.

TECHNICAL FIELD

The present disclosure relates to the field of positioning technology, and in particular, to a positioning method and device for a game and a mobile terminal.

BACKGROUND ART

For games in the related art, in a conventional method for selecting a target position from the game map, the player clicks on a certain coordinate point in the game map, and determines this coordinate point as the target position. However, since during the process that the player clicks the coordinate point in the game map, the finger of the player would block the coordinate point and the surrounding area, so that there may be a certain deviation between the target position determined by clicking of the player and the target position expected by the player, that is, the precision of the target position actually determined is poor, which affects game experience of the player to a certain extent.

SUMMARY

In view of this, the purpose of the present disclosure is to provide a positioning method for a game and a mobile terminal, which can effectively improve the precision of determining the target position, thereby significantly improving the game experience of the player.

According to an embodiment of the present disclosure provides a positioning method for a game, wherein a graphical user interface is provided through a terminal device. The method comprises steps of: providing a first game map and a positioning icon through the graphical user interface; controlling, in response to a first dragging operation acting on the first game map, the positioning icon to be fixed at a position, and controlling the first game map to move relative to the positioning icon; and determining, in response to ending of the first dragging operation, a target position according to a first position at which the positioning icon is located in the first game map.

According to another embodiment of the present disclosure also provides a mobile terminal, comprising a processor and a memory, wherein the memory stores computer programs, wherein the method of any one item provided in the first aspect is performed when the computer programs are executed by the processor to implement at least one executable instruction, and the at least one executable instruction comprises:
  providing a first game map and a positioning icon through the graphical user interface;
  controlling, in response to a first dragging operation acting on the first game map, the positioning icon to be fixed at a position, and controlling the first game map to move relative to the positioning icon; and
  determining, in response to ending of the first dragging operation, a target position according to a first position at which the positioning icon is located in the first game map.

According to another embodiment of the present disclosure also provides a non-transitory computer storage medium, configured for storing at least one executable instruction, and the at least one executable instruction comprises: providing a first game map and a positioning icon through the graphical user interface;
  controlling, in response to a first dragging operation acting on the first game map, the positioning icon to be fixed at a position, and controlling the first game map to move relative to the positioning icon; and
  determining, in response to ending of the first dragging operation, a target position according to a first position at which the positioning icon is located in the first game map.

BRIEF DESCRIPTION OF DRAWINGS

In order to illustrate the embodiments of the present disclosure or the technical solutions in the related art more clearly, the drawings that need to be used in the description of the embodiments or the related art are briefly introduced as follows. Obviously, the drawings in the following description show some embodiments of the present disclosure. For those skilled in the art, other drawings can also be obtained based on these drawings without creative efforts.

DETAILED DESCRIPTION OF EMBODIMENTS

In order to make the purposes, technical solutions and advantages of the embodiments of the present disclosure clearer, the technical solutions of the present disclosure will be described clearly and completely below with reference to the embodiments. Obviously, the described embodiments are part, but not all of the embodiments of the present disclosure. Based on the embodiments of the present disclosure, all other embodiments obtained by those skilled in the art without creative efforts shall fall within the protection scope of the present disclosure.

Figure 1:
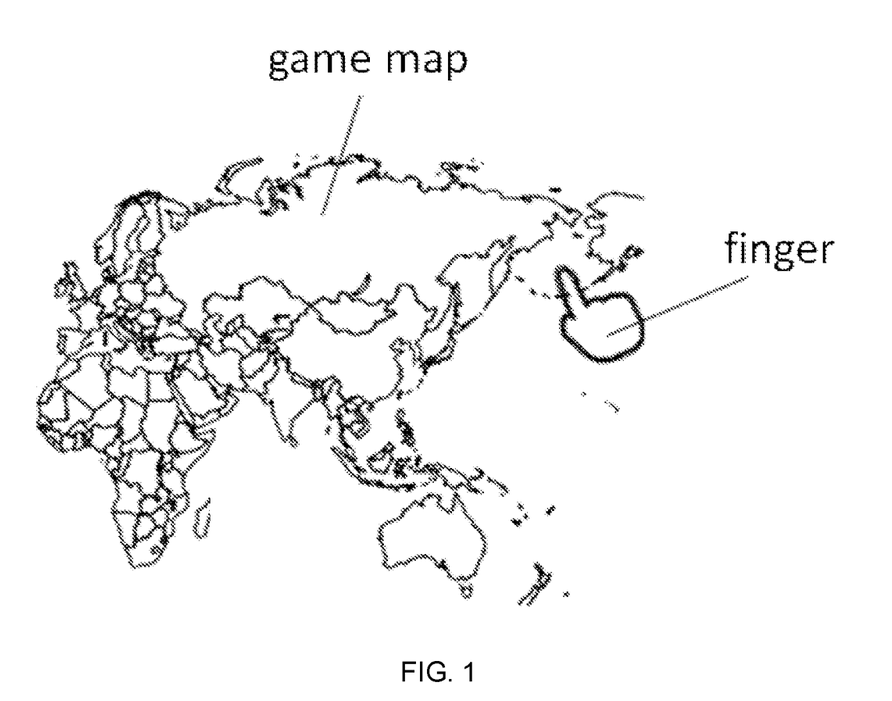
FIG. 1 is a schematic view of a game map provided by an embodiment of the present disclosure.

At present, in the related art, the target position is determined by clicking and selecting a certain coordinate point in the game map, and the precision of the target position may be poor due to the blocking of the finger of the player. For example, seeing the schematic diagram of a game map shown in FIG. 1, when the player clicks and select a certain coordinate point in the game map, this coordinate point and its surrounding area will be blocked by the finger, which will therefore affect the sight line of the player, resulting in poor precision of the actually determined target position, which influences the game experience of the player to a certain extent.

Based on this, the embodiment of the present disclosure provides a positioning method and device for a game and a mobile terminal, which can effectively improve the precision of determining the target position, thereby significantly improving the game experience of the player.

Figure 2:
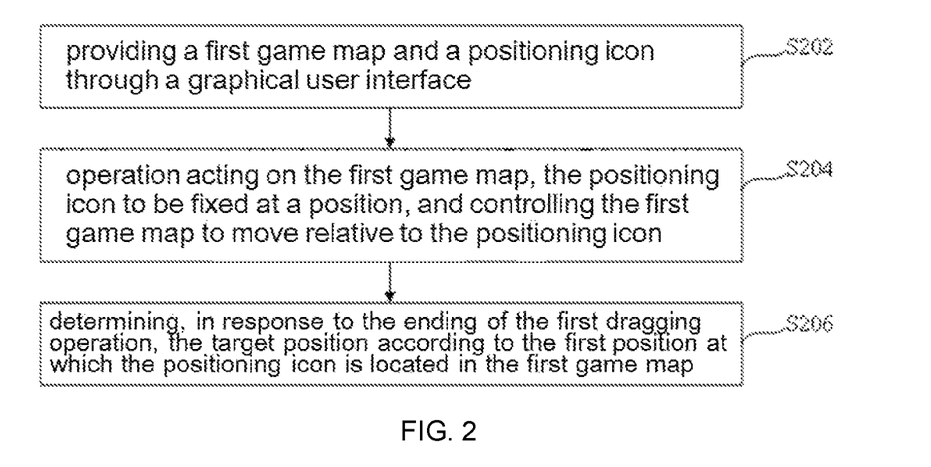
FIG. 2 is a schematic flowchart of a positioning method for a game provided by an embodiment of the present disclosure.

In order to facilitate the understanding of this embodiment, a positioning method for a game disclosed in an embodiment of the present disclosure is first introduced in detail. A graphical user interface is provided through a terminal device, seeing a schematic flowchart of a positioning method for a game shown in FIG. 2, the method mainly comprises the following steps S202 to S206:

Step S202 of providing a first game map and a positioning icon through a graphical user interface, wherein in one embodiment, a game screen may be provided through a graphical user interface, the game screen comprises a second game map and/or a positioning control, wherein in response to an expansion operation for the second game map, or in response to a touch operation for the positioning control, the game screen will comprise the first game map and a positioning icon, wherein the first game map can also be called as a big map, the second game map can also be called as a small map, the range of the area displayed by the first game map can be larger than the range of the area displayed by the second game map, and the positioning icon can be used to indicate the target location;

Step S204 of controlling, in response to the first dragging operation acting on the first game map, the positioning icon to be fixed at a position, and controlling the first game map to move relative to the positioning icon, wherein in one embodiment, when the player drags the first game map, the position of the positioning icon is fixed relative to the graphical user interface, and the first game map will move relative to the positioning icon, along with the gesture corresponding to the first dragging operation;

Step S206 of determining, in response to the ending of the first dragging operation, the target position according to the first position at which the positioning icon is located in the first game map, wherein for example, when the finger of the player leaves the screen of the terminal device, it is determined that the first dragging operation is finished, and at this time, the first position at which the positioning icon is located in the first game map can be determined as the target position.

In the above-mentioned positioning method for the game provided by the embodiment of the present disclosure, the position of the positioning icon is fixed and the first game map is made to move relative to the positioning icon, such that during the positioning process, the finger of the player will not block the first position at which the positioning icon is located in the first game map, thus the target position with higher precision can be determined and obtained based on the first position, thereby significantly improving the game experience of the player.

In practical applications, the game screen provided through the graphical user interface may comprise a virtual scene area, a second game map and a positioning control. For example, as a schematic diagram of a game screen shown in FIG. 3, the second game map is located at the upper left corner of the virtual scene area, and the position of the positioning control on the graphical user interface is at the edge of the second game map.

Figure 3:
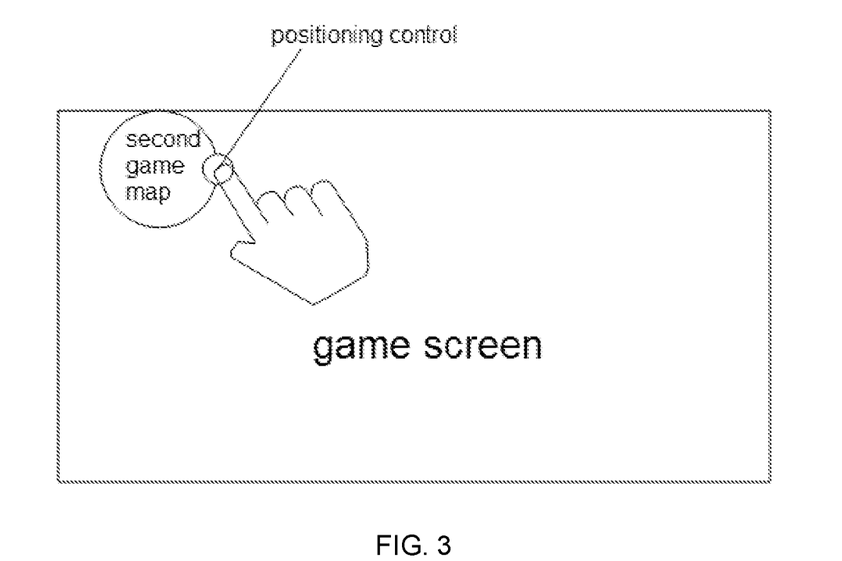
FIG. 3 is a schematic view of a game screen provided by an embodiment of the present disclosure.

On the basis of the above FIG. 3, the embodiment of the present disclosure provides an example of providing a first game map and a positioning icon through a graphical user interface (GUI), wherein (1) in response to an expansion operation for the second game map, the initial display view field of the first game map is determined, wherein the above-mentioned expansion operation may comprise a long-press operation, a touch operation, a double-click operation, etc. acting on the second game map, and may also comprise a touch operation acting on the positioning control; the initial display view field of the first game map can be understood as a display range of the first game map. For example, when the player clicks the positioning control, the second position at which the target virtual object is located will be taken as the center, and the first game map will comprise a virtual scene area within a range of a preset distance from the second position; and the target virtual object mentioned above may comprise the main city, the player roles or designated buildings, etc. (2) the first game map is displayed according to the initial display view field through the graphical user interface, and the positioning icon is displayed, wherein the positioning icon can be located at a designated position in the GUI, such as, the center (midpoint), upper side, lower side, left side, right side, etc. Exemplarily, referring to the schematic diagram of another game screen shown in FIG. 4, the entire game screen is the first game map, and the positioning icon is located in the center of the screen of the terminal device. Referring to the schematic diagram of another game screen shown in FIG. 5, the graphical user interface comprises a map display area, the map display area is located on the left side of the graphical user interface, the graphic display interface is used to display the above-mentioned first game map, and the positioning icon is located in the center of the map display area.

As for the aforementioned step S204, the embodiment of the present disclosure further provides an example in which it controls in response to the first dragging operation acting on the first game map the positioning icon to be fixed at a position and controls the first game map to move relative to the positioning icon. The movement path corresponding to the first dragging operation can be determined in response to the first dragging operation acting on the first game map, and then the position of the positioning icon is controlled to be fixed, and the first game map is controlled to move relative to the positioning icon according to the movement path. Here, the movement path corresponding to the first dragging operation can also be understood as a sliding track. In practical applications, the position of the positioning icon is fixed relative to the GUI, and the first game map will move along the movement path. Optionally, the complete map of the game can be divided into a plurality of sub-regions in advance. In order to facilitate the player to know the first position at which the positioning icon is located in the first game map, the sub-region corresponding to the first position can be highlighted, or the outline of the sub-region corresponding to the first position is highlighted, so as to improve experience of the player in the positioning process.

In practical applications, the first game map comprises a plurality of virtual scene areas displayed according to the first scale. After the target position is determined, it is also possible to jump to the virtual scene area corresponding to the target position. In one embodiment, it can be judged whether a scene jump operation is detected, wherein when the judgment result is yes, the virtual scene area corresponding to the target position is displayed through a graphical user interface, according to the second scale, wherein the scale, which is the ratio of the length value of the line segment on the game map to the length value of the horizontal projection of the response line segment of the virtual scene area, is used to indicate the reduction degree of the map graphics. Optionally, the first scale can be smaller than the second scale. In addition, the scene jump operation may comprise the ending of the first dragging operation, the first designation operation (such as a double-click operation) acting on the designated area, or the second designation operation (such as a touch operation) acting on the jump determination control. When a scene jump operation is detected, the virtual scene area corresponding to the target position can be displayed according to the second scale, wherein the precision of the virtual scene area displayed according to the second scale is higher than that of the virtual scene area displayed according to the first scale.

Figure 4:
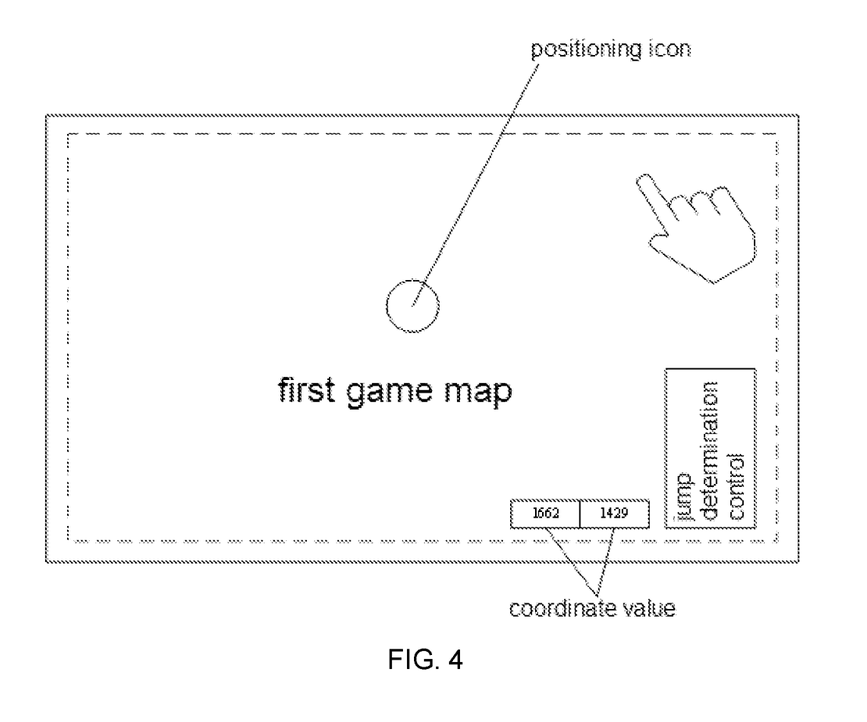
FIG. 4 is a schematic view of another game screen provided by an embodiment of the present disclosure.
Figure 5:
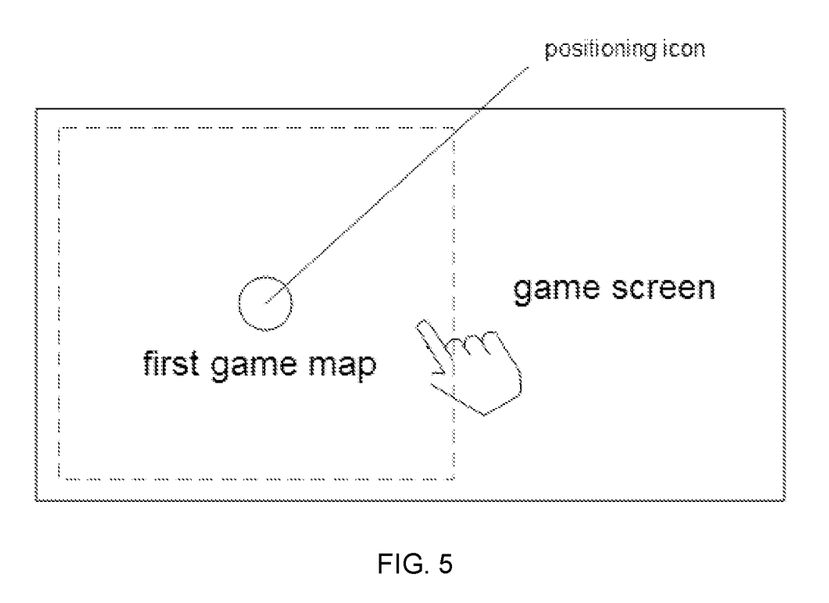
FIG. 5 is a schematic view of another game screen provided by an embodiment of the present disclosure.

For ease of understanding, the embodiments of the present disclosure provide some modes for judging whether a scene jump operation is detected, referring to the following modes 1 to 3:

Mode 1, in which if the ending of the first dragging operation is monitored, it is determined that a scene jump operation is detected, wherein for ease of understanding, the embodiment of the present disclosure provides an example of mode 1 on the basis of FIG. 5, which can judge whether the corresponding contact position at the ending of the first dragging operation is located in the first game map, that is, judge whether the position of the finger of the player when leaving the terminal device is located in the above-mentioned map display area, wherein if yes, it is determined that the scene jump operation is detected, the first game map is retracted, and it jumps to the virtual scene area corresponding to the target position, and if no, a jump is not carried out;

Mode 2, in which if the first designation operation for the designated area is monitored, it is determined that a scene jump operation is detected, wherein the designated area may be an area outside the map display area; the first designation operation may comprise a double-click operation; continuously referring to FIG. 5, when the first dragging operation ends, the expanded state of the first game map is maintained, and no jump to the virtual scene area is performed; if a double-click operation on an area outside the map display area is monitored, the first game map is retracted and it jumps to the virtual scene area corresponding to the target position;

Mode 3, in which the jump determination control is displayed through a graphical user interface, wherein if the second designation operation for the jump determination control is monitored, it is determined that a scene jump operation is detected, wherein the second operation may comprise a touch operation; for ease of understanding, an embodiment of the present disclosure provides example of Mode 3 on the basis of FIG. 4. FIG. 4 provides a jump determination control, wherein when the first dragging operation ends, the expanded state of the first game map is kept, and no jump to the virtual scene area is performed; and if the touch operation for the jump determination control is monitored, the first game map is retracted and it jumps to the virtual scene area corresponding to the target location.

In actual applications, any one of the foregoing modes, mode 1, mode 2, and mode 3, may be selected to detect the scene jump operation, which may be set based on actual requirements and not limited in this embodiment of the present disclosure.

In addition, with FIG. 4 as an example, in the initial state, the GUI will display the first game map centered on the second position at which the target virtual object is located, and the display range of the first game map will change following the first dragging operation. In practical applications, the second position at which the target virtual object is located may gradually move out of the display range of the first game map. At this time, in order to facilitate the player to learn the relative position relationship between the second position at which the target virtual object is located and the first position at which the positioning icon is located, the floating icon can be displayed through the graphical user object, and for easy of understanding, the following Steps 1 to 2 may be referred to.

In Step 1, it is determined whether the current display view field of the first game map comprises the second position at which the target virtual object is located, wherein if no, step 2 is performed. In practical applications, it is judged whether the second position at which the target virtual object is located has moved out of the display range of the first game map, wherein if no, it is determined that the current display view field does not comprise the second position at which the target virtual object is located.

In Step 2, a floating icon is displayed through a graphical user interface, wherein the floating icon is used to represent the relative positional relationship between the second position and the first position, and the relative positional relationship comprises an orientation relationship and/or a distance relationship. For ease of understanding, referring to the schematic diagram of another game screen shown in FIG. 6, the display position of the second position icon can be determined according to the orientation relationship between the second position and the first position. For example, the second position is at the lower left corner of the first position, and then a floating icon can be displayed at the lower left edge of the first game map. Further, along with the change of the first position at which the positioning icon is located, the display position of the floating icon can also be changed accordingly.

Figure 6:
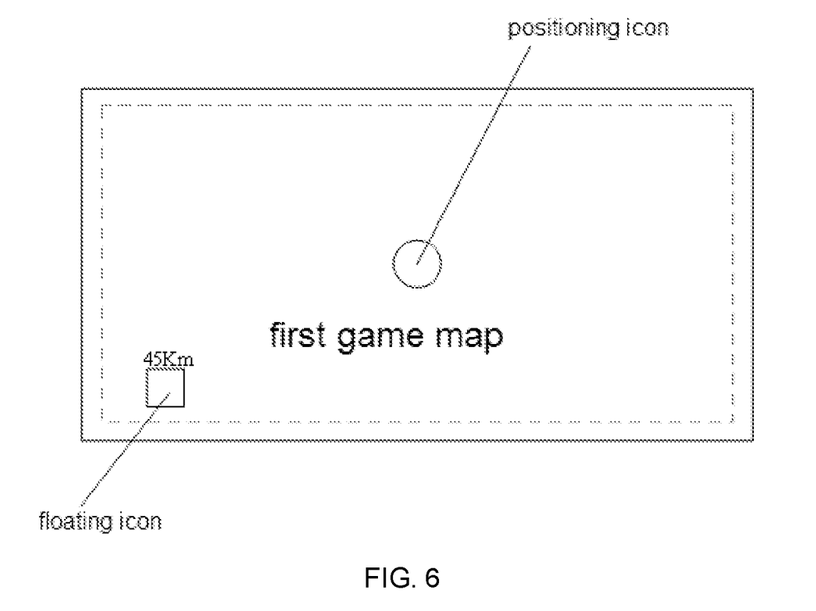
FIG. 6 is a schematic view of another game screen provided by an embodiment of the present disclosure.

In order to facilitate the player to learn the distance relationship between the second position and the first position, a distance value between the first position and the second position may also be calculated, and the distance value may be displayed in a preset area of the floating icon. For example, as shown in FIG. 6, the distance value is displayed above the floating icon. It should be noted that the distance relationship also changes along with the change of the first position at which the positioning icon is located.

Considering that the player may have a repositioning requirement, or in order to facilitate the player to view the second position at which the target virtual object is located, it is also possible to control, in response to the touch operation on the floating icon, the first game map to restore from the current display view field to the initial display view field. With FIG. 6 as an example, the floating icon is located at the lower left corner of the positioning icon. When the player clicks the floating icon, the first game map will automatically move, and when the first position at which the positioning icon is located and the second position at which the target virtual object is located coincide with each other, the moving is stopped, and at this time, the first game map has returned to the initial display view field. For ease of understanding, this embodiment of the present disclosure provides an application example, wherein with the target virtual object being the main city as an example, in the first game map, if the player makes the display view field of the first game map move, when the display view field does not comprise the main city, a floating icon will be provided through the graphical user interface, and the floating icon is the icon corresponding to the main city, and at the same time, the distance between the first position and the main city will be displayed; and when the player clicks the floating icon, it will directly position the main city in the first game map.

In addition, the embodiment of the present disclosure also provides a mode for determining the target position by dragging the positioning icon, referring to the following steps a to b.

In Step a, in response to the second dragging operation for the positioning icon, the first game map is controlled to be fixed at a position, and the positioning icon is controlled to move relative to the first game map. In practical applications, the player can click and drag the positioning icon to control the positioning icon to move relative to the first game map, and at this time, the position of the first game map is fixed. Considering that the finger of the player may block the positioning icon to a certain extent in the process of the player dragging the positioning icon, it will affect the positioning precision. In order to solve this problem, when the embodiment of the present disclosure performs the above step a, the following Step a1 to Step a2 may be referred to.

Figure 7:
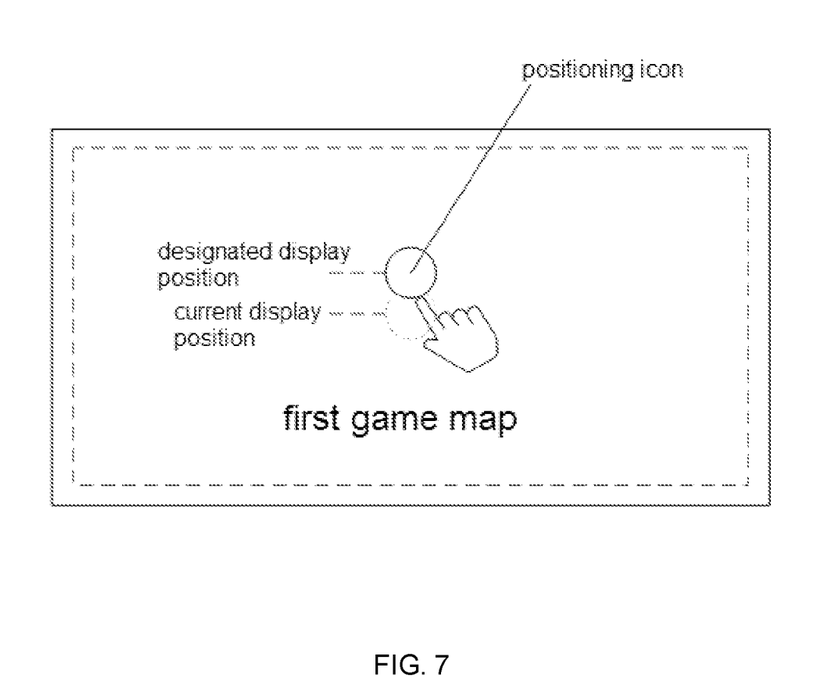
FIG. 7 is a schematic view of another game screen provided by an embodiment of the present disclosure.

In Step a1, in response to the second dragging operation for the positioning icon, the positioning icon is controlled to move from the current display position to the designated display position, wherein with the game screen shown in FIG. 4 as an example, the current display position can be the center of the graphical user interface, and the designated display position can be the designated orientation of the current display position, and is separated from the current display position by a designated distance. For example, referring to the schematic diagram of another game screen shown in FIG. 7, the designated display position is located directly above the current display position, and is away from the current display position by 30 pixels, so as to avoid the finger from blocking the positioning icon, thereby improving the positioning precision.

In Step a2, the first game map is controlled to be fixed at a position, and the positioning icon is controlled to move, relative to the first game map, starting from the designated display position. In the actual application, the player presses the positioning icon in the first game map, the positioning icon will automatically move up by 30 pixels to avoid the finger of the player from blocking the line of sight, and then the player drags the positioning icon to realize that the positioning icon moves relative to the first game map, thus achieving the precise positioning.

In Step b, in response to the ending of the second dragging operation, the target position is determined according to the third position at which the positioning icon is located in the first game map. For example, when the finger of the player leaves the screen of the terminal device, it is determined that the second dragging operation ends, and at this time, the third position at which the positioning icon is located in the first game map can be determined as the target position.

In one embodiment, the coordinate value of the first position at which the positioning icon is located can also be displayed through a graphical user interface, and the coordinate value changes along with the change of the first position. As shown in FIG. 4, the coordinate value is displayed at the lower right corner of the first game map to assist in positioning for the player through the coordinate value, which further improves the positioning precision.

In order to facilitate the understanding on the positioning method for a game provided by the above-mentioned embodiment, the embodiment of the present disclosure also provides an application example of the positioning method for a game. Referring to FIG. 3 and FIG. 5 above, if the player long-presses the positioning control on the edge of the small map, the small map will expand to a half-screen large map, the finger of the player is kept in the state of not leaving the screen of the terminal device and moves in the large map, the large map will automatically move following the finger of the player until the finger of the player stops moving to the edge of the large map. When the player releases the finger, the big map will be retracted, and the game screen will jump directly to the virtual scene area corresponding to the first position at which the positioning icon is located when the finger is released. If the finger of the player is kept in the state of not leaving the screen and makes the large map removed, the positioning operation is cancelled, and at this time, the big map will be retracted (closed) and the game screen will not jump.

To sum up, in the embodiment of the present disclosure, the position of the positioning icon can be fixed, and the first game map can be moved relative to the positioning icon, and the first game map can also be fixed, and the positioning icon can be moved from the current display position to the designated display position, and then on the basis of this, the positioning icon is made to move relative to the first game map. Both of the above two modes can prevent during the positioning process the finger of the player from blocking the first position at which the positioning icon is located in the first game map, so that the target position with higher precision can be determined based on the first position, thereby significantly improving the game experience of the player.

Figure 8:
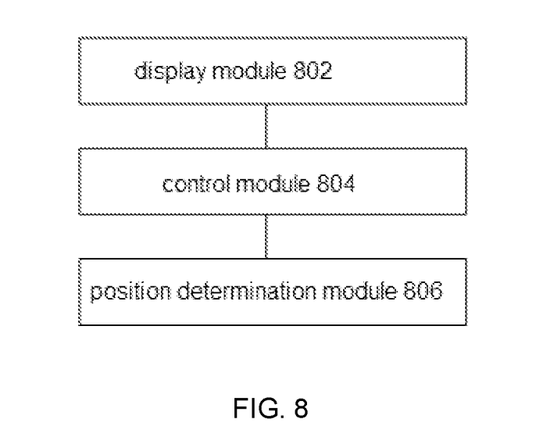
FIG. 8 is a schematic structural diagram of a positioning device for a game provided by an embodiment of the present disclosure.

For the positioning method for a game provided by the foregoing embodiments, an embodiment of the present disclosure further provides a positioning device for a game, which provides a graphical user interface through a terminal device. Referring to the schematic structural diagram of a positioning device for a game shown in FIG. 8, the device mainly comprises the following parts:

a display module 802, configured for providing a first game map and a positioning icon through a graphical user interface;

a control module 804, configured to control, in response to the first dragging operation acting on the first game map, the positioning icon to be fixed at a position, and to control the first game map to move relative to the positioning icon; and a position determination module 806, configured to determine the target position according to the first position at which the positioning icon is located in the first game map, in response to the ending of the first dragging operation.

In the positioning device for a game provided by the embodiment of the present disclosure, through fixing the position of the positioning icon and making the first game map move relative to the positioning icon, during the positioning process, the finger of the player will not block the first position at which the positioning icon is located in the first game map, so that the target position with higher precision can be determined based on the first position, thereby significantly improving the game experience of the player.

In one embodiment, the display module 802 is further configured to: determine the initial display view field of the first game map in response to the expansion operation for the second game map; display the first game map according to the initial display view field through the graphical user interface, and display the positioning icon.

In one embodiment, the control module 804 is further configured to: determine, in response to the first dragging operation acting on the first game map, the movement path corresponding to the first dragging operation; control the positioning icon to be fixed at a position, and control the first game map to move relative to the positioning icon, according to the movement path.

In one embodiment, the first game map comprises a plurality of virtual scene areas displayed according to a first scale; the above-mentioned device further comprises a jumping module configured for judging whether a scene jump operation is detected; and displaying, if yes, the virtual scene area corresponding to the target position, according to the second scale, through the graphic user interface.

In one embodiment, the jumping module is further configured to: determine, if the ending of the first dragging operation is monitored, that a scene jump operation is detected; or determine, if the first designation operation for the designated area is monitored, that a scene jump operation is detected; or display a jump determination control through a graphical user interface, and determine, if the second designation operation for the jump determination control is monitored, that a scene jump operation is detected.

In one embodiment, the jumping module is further configured to: judge whether the corresponding contact position when the first dragging operation ends is located in the first game map; and determine, if yes, that a scene jump operation is detected.

In one embodiment, the above-mentioned device further comprises a floating display module, which is used for: judging whether the current display view field of the first game map comprises the second position at which the target virtual object is located; and displaying, if no, a floating icon through a graphical user interface, wherein the floating icon is used to represent the relative positional relationship between the second position and the first position, and the relative positional relationship comprises an orientation relationship and/or a distance relationship.

In one embodiment, the floating display module is further configured to: calculate a distance value between the first position and the second position, and display the distance value in a preset area of the floating icon.

In one embodiment, the floating display module is further configured to: control, in response to a touch operation on the floating icon, the first game map to restore from the current display view field to the initial display view field.

In one embodiment, the above-mentioned device further comprises a positioning module configured to: control, in response to the second dragging operation for the positioning icon, the first game map to be fixed at the position, and control the positioning icon to move relative to the first game map; and determine, in response to the ending of the second dragging operation, the target position according to the third position at which the positioning icon is located in the first game map.

In one embodiment, the positioning module is further configured to: control, in response to the second dragging operation for the positioning icon, the positioning icon to move from the current display position to the designated display position; control the first game map to be fixed at a position, and control the positioning icon to move relative to the first game map, starting from the designated display position.

The implementation principle and generated technical effects of the device provided by the embodiment of the present disclosure are the same as those of the foregoing method embodiments. For brief description, the corresponding content in the foregoing method embodiments may be referred to, for the parts not mentioned in the device embodiment.

The embodiment of the present disclosure provides a mobile device. Specifically, the mobile device comprises a processor and a storage device, and computer programs are stored on the storage device, wherein when the computer programs are run by the processor, the method according to any one of the above-mentioned embodiments is executed.

Figure 9:
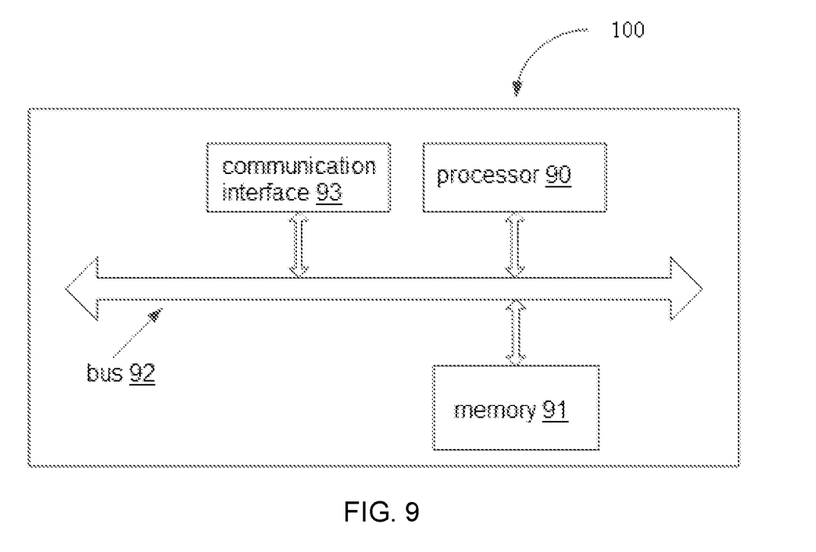
FIG. 9 is schematic structural diagram of a mobile device provided by an embodiment of the present disclosure.

FIG. 9 is a schematic structural diagram of a mobile device provided by an embodiment of the present disclosure. The mobile device 100 comprises: a processor 90, a memory 91, a bus 92, and a communication interface 93. The processor 90, the communication interface 93 and the memory 91 are connected by the bus 92; and the processor 90 is used to execute the executable modules, such as computer programs, stored in memory 91.

Here, the memory 91 may comprise a high-speed random access memory (RAM), and possibly also the non-volatile memory, such as, at least one disk memory. The communication between the network element of the system and at least one other network element is realized through at least one communication interface 93 (which may be wired or wireless), and the Internet, a wide area network, a local area network, a metropolitan area network, etc. may be used.

The bus 92 may be an ISA bus, a PCI bus, an EISA bus, or the like. The buses can be divided into an address bus, a data bus, a control bus, and the like. For ease of presentation, only one bidirectional arrow is used in FIG. 9, but it does not mean that there is only one bus or one type of buses.

Here, the memory 91 is used to store programs, and the processor 90 executes the programs after receiving the execution instruction. The method executed by the device, which is defined by the flow chart disclosed in any of the foregoing embodiments of the present disclosure, can be applied to the processor 90 or implemented by the processor 90.

The processor 90 may be an integrated circuit chip with signal processing capability. In the implementation process, each step of the above-mentioned method can be completed by a hardware integrated logic circuit or instructions in the form of software in the processor 90. The above-mentioned processor 90 may be a general-purpose processor, comprising a central processing unit (referred to as CPU), a network processor (NP for short), etc.; may also be a digital signal processor (DSP for short), an Application Specific Integrated Circuit (ASIC for short), Field-Programmable Gate Array (FPGA for short) or other programmable logic devices, discrete gate or transistor logic devices, and discrete hardware components. Various methods, steps, and logical block diagrams disclosed in the embodiments of the present disclosure can be implemented or executed. A general purpose processor may be a microprocessor, or the processor may be any conventional processor or the like. The steps of the method disclosed in conjunction with the embodiments of the present disclosure may be directly embodied as being executed by a hardware decoding processor, or executed by a combination of hardware and software modules in the decoding processor. The software modules may be located in the random access memory, flash memory, read-only memory, programmable read-only memory or electrically erasable programmable memory, registers and other storage media which are mature in the art. The storage medium is located in the memory 91, and the processor 90 reads the information in the memory 91, and completes the steps of the above method in combination with its hardware.

The computer program product of readable storage medium provided by the embodiments of the present disclosure comprises a computer-readable storage medium storing program codes, and the instructions comprised in the program codes can be used to execute the methods described in the foregoing method embodiments. The foregoing method embodiments may be referred to for the detailed implementations, which are not described herein again.

The functions, if implemented in the form of software functional units and sold or used as an independent product, may be stored in a computer-readable storage medium. Based on this understanding, the technical solution of the present disclosure can be embodied in the form of a software product essentially, or a part of the technical solution which contributes to the related art or a part of the technical solution can be embodied in the form of a software product. The computer software product is stored in a storage medium, comprising several instructions which are used to make a computer device (which may be a personal computer, a server, or a network device, etc.) to execute all or part of the steps of the methods described in the various embodiments of the present disclosure. The aforementioned storage medium comprises: a U disk, a mobile hard disk, a Read-Only Memory (ROM), a Random Access Memory (RAM), a magnetic disk or an optical disk and other media that can store program codes.

Finally, it should be noted that the above-mentioned embodiments are only specific implementations of the present disclosure, and are used to illustrate the technical solutions of the present disclosure, but not intended to limit the present disclosure, and the protection scope of the present disclosure is not limited thereto. Although the present disclosure has been described in detail referring to the foregoing embodiments, those skilled in the art should understand that: any person skilled in the art, who is familiar with the technical field, can still modify the technical solutions described in the foregoing embodiments within the technical scope disclosed by the present disclosure, or can easily think of changes or equivalently replace some of the technical features. These modifications, changes or replacements do not make the essence of the corresponding technical solutions deviate from the spirit and scope of the technical solutions of the embodiments of the present disclosure, and should be covered by the protection scope of the present disclosure. Therefore, the protection scope of the present disclosure should be based on the protection scope of the claims.

What is claimed is:

1. A method for evaluating input via a graphical user interface, wherein the graphical user interface is provided through a terminal device, and the method comprises steps of:
   providing a first map and a positioning icon through the graphical user interface;
   in response to a first dragging operation acting on the first map;
   controlling the positioning icon to be fixed at a position on the graphical user interface, and
   controlling the first map to move on the graphical user interface relative to the positioning icon, comprising:
   determining, in response to the first dragging operation acting on the first map, a movement path corresponding to the first dragging operation; and
   controlling the first map to move relative to the positioning icon according to the movement path;
   determining a first position of the positioning icon relative to the first map; and
   determining that a target position of the first dragging operation corresponds to the first position.

2. The method according to claim 1, wherein the step of providing a first map and a positioning icon through the graphical user interface comprises:
   determining an initial display view field of the first map in response to an expansion operation for a second map; and
   displaying the first map according to the initial display view field through the graphical user interface, and displaying the positioning icon.

3. The method according to claim 1, wherein the first map comprises a plurality of virtual scene areas displayed according to a first scale, and the method further comprises:
   judging whether a scene jump operation is detected,
   wherein if yes, a virtual scene area corresponding to the target position is displayed according to a second scale through the graphical user interface.

4. The method according to claim 3, wherein the step of judging whether a scene jump operation is detected comprises:
   determining, if an ending of the first dragging operation is monitored, that the scene jump operation is detected; or
   determining, if a first designation operation for a designated area is monitored, that the scene jump operation is detected; or
   displaying a jump determination control through the graphical user interface, and determining that the scene jump operation is detected, if a second designation operation for the jump determination control is monitored.

5. The method according to claim 4, wherein the step of determining if the ending of the first dragging operation is monitored that a scene jump operation is detected comprises:
   judging whether a corresponding contact position when the first dragging operation ends is located in the first map,
   wherein if yes, it is determined that a scene jump operation is detected.

6. The method according to claim 1, wherein the method further comprises:
   judging whether a current display view field of the first map comprises a second position where a target virtual object is located,
   wherein if no, a floating icon is displayed through the graphical user interface, wherein the floating icon is used to represent a relative positional relationship between the second position and the first position, and the relative positional relationship comprises an orientation relationship and/or a distance relationship.

7. The method according to claim 6, wherein the method further comprises:
   calculating a distance value between the first position and the second position, and displaying the distance value in a preset area of the floating icon.

8. The method according to claim 6, wherein the method further comprises:

controlling, in response to a touch operation on the floating icon, the first map to be restored from the current display view field to an initial display view field.

9. The method according to claim 1, wherein the method further comprises:
controlling, in response to a second dragging operation for the positioning icon, the first map to be fixed at a position, and controlling the positioning icon to move relative to the first map; and
determining, in response to ending of the second dragging operation, a target position according to a third position at which the positioning icon is located in the first map.

10. The method according to claim 9, wherein the step of controlling in response to a second dragging operation for the positioning icon the first map to be fixed at a position and controlling the positioning icon to move relative to the first map comprises:
controlling, in response to the second dragging operation for the positioning icon, the positioning icon to move from a current display position to a designated display position; and
controlling the first map to be fixed at a position, and controlling the positioning icon to move relative to the first map, starting from the designated display position.

11. A mobile terminal, comprising a processor and a memory,
wherein the memory stores computer programs, wherein the computer programs are executed by the processor to implement at least one executable instruction, and the at least one executable instruction comprises:
providing a first map and a positioning icon through a graphical user interface;
in response to a first dragging operation acting on the first map:
controlling the positioning icon to be fixed at a position on the graphical user interface, and
controlling the first map to move on the graphical user interface relative to the positioning icon, comprising:
determining, in response to the first dragging operation acting on the first map, a movement path corresponding to the first dragging operation; and
controlling the first map to move relative to the positioning icon according to the movement path; and
in response to ending of the first dragging operation:
determining a first position of the positioning icon relative to the first map; and
determining that a target position of the first dragging operation corresponds to the first position.

12. A non-transitory computer storage medium, configured for storing at least one executable instruction, and the at least one executable instruction comprises:
providing a first map and a positioning icon through a graphical user interface;
in response to a first dragging operation acting on the first map:
controlling the positioning icon to be fixed at a position on the graphical user interface, and
controlling the first map to move on the graphical user interface relative to the positioning icon, comprising:
determining, in response to the first dragging operation acting on the first map, a movement path corresponding to the first dragging operation; and
controlling the first map to move relative to the positioning icon according to the movement path; and
in response to ending of the first dragging operation:
determining a first position of the positioning icon relative to the first map; and
determining that a target position of the first dragging operation corresponds to the first position.

13. The method according to claim 1, further comprising:
dividing a complete map into a plurality of sub-regions in advance; and
highlighting a sub-region corresponding to the first position, or highlighting an outline of the sub-region corresponding to the first position.

14. The method according to claim 3, wherein the first scale is smaller than the second scale.

15. The method according to claim 5, wherein if the corresponding contact position when the first dragging operation ends is not located in the first map, a jump is not carried out.

16. The method according to claim 1, wherein the graphical user interface comprises a map display area, the map display area is located on a left side of the graphical user interface, a graphic display interface is used to display the first map, and the positioning icon is located in a center of the map display area.

17. The method according to claim 2, wherein the step of providing a first map and a positioning icon through the graphical user interface comprises:
providing a game screen through the graphical user interface, the game screen comprising the first map and the positioning icon, wherein the game screen further comprises the second map and/or a positioning control, and a position of the positioning control on the graphical user interface is at an edge of the second map.

18. The method according to claim 17, wherein the expansion operation comprises a long-press operation, a touch operation and a double-click operation acting on the second map.

19. The method according to claim 17, wherein the expansion operation comprises a touch operation acting on the positioning control.

* * * * *